March 6, 1934.  J. M. JENNINGS  1,950,308
IMPROVED PROCESS FOR PRODUCING LUBRICANTS
Filed Aug. 14, 1929
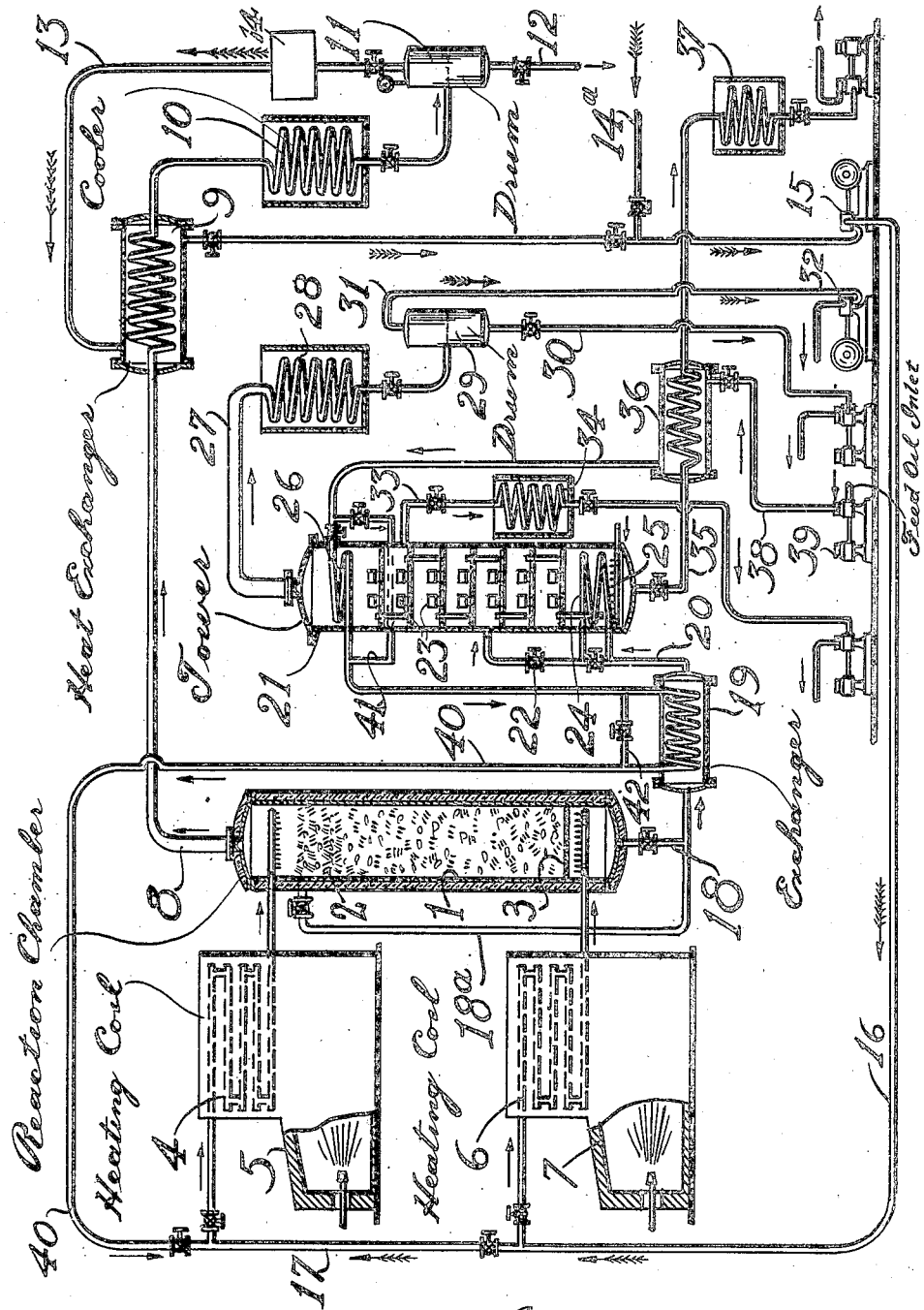

Patented Mar. 6, 1934

1,950,308

UNITED STATES PATENT OFFICE 1,950,308

IMPROVED PROCESS FOR PRODUCING LUBRICANTS

James M. Jennings, Baton Rouge, La., assignor to Standard-I. G. Company

Application August 14, 1929, Serial No. 385,762

8 Claims. (Cl. 196—78)

The present invention relates to an improved process for obtaining valuable products from crude oil and the like, and more specifically comprises a process for obtaining superior grade lubricants from crudes which have heretofore been considered unsuitable for such a purpose. My invention will be fully understood from the following description and the drawing which illustrates one form of apparatus constructed according to my invention.

The drawing is a diagrammatic view in sectional elevation of an apparatus suitable for carrying out my invention and indicates the flow of materials.

Referring to the drawing, reference character 1 designates a reaction chamber adapted to operate at pressure in considerable excess of atmospheric and at an elevated temperature. The reactor is preferably in a vertical position and is packed with lump material 2 of a suitable catalytic nature described below. This material may be supported in any preferred manner, such as by the grid 3.

Hot oil is passed rapidly through a heating coil 4 arranged in a suitable furnace setting 5 and discharged into the upper part of the reaction chamber while a heated gas rich in free hydrogen is forced into the base of the reaction chamber from coil 6 which is arranged in setting 7. While the reaction chamber may be internally heated, for example, by electric heaters (not shown), I prefer to regulate and maintain its temperature by the heat of the incoming oil and gas. The oil and gas flow in opposite directions over the catalytic material in such a manner that a thorough contact is provided.

Gas and light oil vapor are withdrawn from the top of reactor 1 by line 8 to a heat exchanger 9, cooler 10 and separater drum 11, all maintained at the system operating pressure, from which oily condensate is removed by pipe 12. Residual gas from drum 11 then passes by line 13 to a purification system designated generally by 14 and to heat exchanger 9. Fresh high pressure hydrogen or a gas rich in free hydrogen is admitted by pipe 14a. The gas pressure is raised to the requisite degree by booster 15 and forced through line 16 to heating coil 6, described above. If desired, a part of the high pressure gas may be forced into the oil heating coil by branch pipe 17.

Hot oil is withdrawn from the base of reactor 1 by pipe 18 and passing through exchanger 19 is discharged through pipe 20 into a flash tower 21 after a reduction of pressure at valve 22. The flash tower is constructed according to any preferred design, but is preferably fitted with bell cap plates 23 for rectification. A heating coil 24 is supplied at the bottom of the tower and a part of the hot oil before reduction of pressure is preferably used as the source of heat as shown in the drawing. A steam spray 25 may be provided in place of or in addition to the heating coil 24 as will be understood. A reflux coil 26 is provided in the top of the tower according to customary practice.

Vapor is withdrawn from the top of the tower by line 27 to condenser 28 and separator 29. Distillate is collected in the separator and may be withdrawn by pipe 30 to storage (not shown) and residual gas is removed by pipe 31. The tower 21 may be operated at a reduced pressure, if desired, by means of vacuum pump 32.

Condensate may be withdrawn from one or more of the plates of tower 21 by suitable lines of which only one 33 is shown for simplicity. Line 33 conducts the oil to a cooler 34 and to storage (not shown).

Residual oil from the base of tower 21 is withdrawn by pipe 35 and after passing thru exchanger 36 and cooler 37 flows to storage (not shown).

Feed oil enters the system by pipe 38 and is forced by pump 39 thru exchanger 36, coil 26, exchanger 19 and by line 40 to the inlet of coil 4 described above. Suitable by-pass lines 42 and 41 are provided around exchanger 19 and coil 26 respectively to provide for suitable regulation.

In the operation of my process oil such as crude petroleum, reduced crude or heavy cuts therefrom is heated rapidly to an elevated temperature to avoid excessive decomposition and is forced into the upper part of reactor 1 under pressure in considerable excess of atmospheric. Pure hydrogen or a gas rich in free hydrogen is also heated and forced into the base of the reactor. The temperature in the reactor is maintained within the range where formation of light oil is relatively slow and preferably between temperature of 700 and 850° F. Pressure is in excess of about 50 atmospheres and is preferably in the range of 100 to 200 atmospheres or higher. The catalyst may be metallic oxides or sulphides or mixtures of such nitrates, and I prefer metal oxides such as chromium and molybdenum oxides compressed in lump form or suitable carried on resistant materials such as kaolin in brick form. These preferred catalysts are not poisoned by sulfur and are suitably classified as sulfactive. The catalytic material may be admixed with the clay or other material before forming into shape or the finished brick may be impregnated with the activating substance or substances in any preferred manner.

It is preferable to maintain the temperature of the reaction chamber by the heat contained in the reacting materials, although the chamber may be heated internally, if necessary. It is desirable to limit the formation of light oil boiling below 400° F., to about 5 to 10% of the feed and provision is made for collecting the light oil which will be largely removed with the gas, but it is not necessary to limit the light oil fractions so closely and in some instances it may be as high as 15 to 20% by volume of the feed. This limitation of the formation of light oil fractions may be obtained by limiting the time of contact of the reactants in the reaction chamber. The feed rate is adjusted to limit the time of contact and the amount of light oil fractions formed with regard to the activity of the catalyst and the temperature of the reaction chamber according to known methods. The gas is preferably recirculated since it is used in considerable excess of the quantity actually combining with the oil and it is preferable to purify the recycled gas of hydrocarbon and hydrogen sulphide or, at least, to reduce the quantity of these impurities in the recycled gas. Purification may be accomplished by an oil wash under high pressure and a wash with an aqueous alkali may be also included, if desired. Other suitable purification methods may also be used.

It is not necessary to the operation of my process that gas and oil flow counter-currently to one another over the catalyst and it is often desirable to preheat both oil and gas by passage through the same coil. The mixture is then forced into the base of the reactor and it is preferable to hold an oil level in the drum so that gas and light oil vapor pass overhead to the condensers and the unvaporized oil is withdrawn from the upper part of the reactor from a point just below the liquid level by a suitably placed draw-off line such as 18a.

The hydrogen-treated oil is usually withdrawn from the base of reactor 1 and may be fractionated in any suitable apparatus maintained under pressure considerably below that prevailing in the reactor. Pressure may be below atmospheric in the fractionation equipment and it is frequently desirable to wash with alkali after hydrogen treatment.

While my process is applicable to all types of oils, it is particularly adapted to viscous oils containing solid or semi-solid resinous or gummy, unsaturated impurities, which may in some instances contain oxygen. Such oils may be made equal or better than the best grade of lubricating oils from crude oil, in respect to color, viscosity-temperature characteristics and general lubricating qualities. As an example of the operation of my process, a distillate of the following characteristics is fed to the reactor packed with a catalyst comprising a mixture of molybdenum and chromium oxides. The temperature was 790° F., pressure 3000 lbs. per sq. inch.

| | |
|---|---|
| Viscosity @ 210° F. | 74 sec. Saybolt |
| Viscosity @ 100° F. | 820 sec. Saybolt |
| Conradson carbon | 1.1% |

A yield of 32.2% of a stock of the following characteristics is obtained.

| | |
|---|---|
| Viscosity @ 210° F. | 74 sec. Saybolt |
| Viscosity @ 100° F. | 672 sec. Saybolt |
| Conradson carbon | .43% |
| Flash | 485° F. |
| Gravity | 27.3° A. P. I. |

The oil is much improved as to color and general lubricating qualities.

The remainder of the oil is a lighter distillate part of which is a suitable gas oil for cracking, partly suitable for high grade spindle oils and the remainder, except for a small volume of gas, is a light oil boiling below 400° F. The yield of oil is often over 100% of the volume of the oil fed.

My invention is not to be limited by any theory of the mechanism of the process nor by any example given merely by way of illustration, but only by the following claims in which I wish to claim all novelty inherent in the invention.

I claim:

1. In a destructive hydrogenation process for the production of high grade lubricants comprising passing a relatively heavy petroleum oil and a gas rich in free hydrogen under pressure in excess of 50 atmospheres over a sulfactive catalyst at a temperature between the approximate limits of 700 and 825° F. for a period of time sufficient for appreciable destructive hydrogenation but insufficient to allow formation of more than about 20% of light oil boiling below about 400° F., an improved method of operation comprising passing the oil and gas through a stationary bed of sulfactive solid catalytic material and separately withdrawing vaporous and liquid products from the reaction zone containing said catalyst bed.

2. In a destructive hydrogenation process for the production of high grade lubricants comprising passing a relatively heavy petroleum oil and a gas rich in free hydrogen under pressure in excess of 50 atmospheres over a sulfactive catalyst at a temperature between the approximate limits of 700 and 825° F. for a period of time sufficient for appreciable destructive hydrogenation but insufficient to allow formation of more than about 20% of light oil boiling below about 400° F., an improved method of operation comprising passing a mixture of hydrocarbon oil and gas rich in free hydrogen upwardly through a reaction vessel containing said catalyst bed, maintaining a liquid level near the top of the reaction vessel, withdrawing gaseous products from the reaction vessel at a point above said liquid level and withdrawing liquid products from the reaction vessel at a point below said liquid level.

3. Process according to claim 2 in which the liquid products are withdrawn from the reaction vessel at substantially the liquid level.

4. In a destructive hydrogenation process for the production of high grade lubricants comprising passing a relatively heavy petroleum oil and a gas rich in free hydrogen under pressure in excess of 50 atmospheres over a sulfactive catalyst at a temperature between the approximate limits of 700 and 825° F. for a period of time sufficient for appreciable destructive hydrogenation but insufficient to allow formation of more than about 20% of light oil boiling below about 400° F., an improved method of operation comprising separately passing the oil into the upper portion of the reaction zone and a gas rich in free hydrogen into the lower portion of the reaction zone and withdrawing gaseous products from the upper portion of said zone and liquid products from the lower portion thereof.

5. Process according to claim 4 in which a liquid level is maintained substantially near the top of the catalyst.

6. Process according to claim 4 in which the liquid products are withdrawn from the reaction zone at a rate to prevent any substantial accumulation of liquid therein so that the liquid reactants pass in a thin film downwardly over the catalytic material.

7. Process according to claim 1 in which the oil withdrawn is immediately distilled by its contained heat at reduced pressure.

8. Process according to claim 1 in which not more than 15% of said light oil is formed.

JAMES M. JENNINGS.